United States Patent Office 2,960,542
Patented Nov. 15, 1960

2,960,542

PREPARATION OF HALOGEN-CONTAINING STILBENES AND BIBENZYLS

William M. Le Suer and Carl W. Stuebe, Cleveland, Ohio, assignors to The Lubrizol Corporation, Willoughby, Ohio, a corporation of Ohio No Drawing. Filed Dec. 10, 1958, Ser. No. 779,285

7 Claims. (Cl. 260—649)

This invention relates to the preparation of halogen-containing aromatic compounds. In a more particular consideration, it relates to the preparation of such aromatic compounds which contain at least two aromatic nuclei.

The alpha,alpha'-diaryl ethylene nucleus has received serious consideration because of its recently discovered value in many applications. It is found, for example, within the chemical structure of brightening agents, sex hormones, etc. In view of such applications the synthesis and further exploitation of such chemical structures is desirable.

The particular products of the process of this invention are alpha,alpha'-diaryl ethylenes in which there is attached also at least one halogen atom to each of the carbon atoms of the ethylene residue. For economic reasons, the process of this invention is particularly applicable to the preparation of alpha,alpha'-diaryl ethylenes in which there is attached at least one chlorine atom to each of the carbon atoms of the ethylene residue. Illustrative of such compounds are the alpha,alpha'-dichlorostilbenes which comprise a preferred type of product of this invention. Other such products include the sym-diphenyltetrachloroethane.

It is accordingly a principal object of this invention to provide a novel method of preparation of the above-indicated halogen-containing aromatic compounds.

It is also an object of the present invention to provide a process for the preparation of halogen-substituted stilbenes.

It is also an object of the present invention to provide a process for the preparation of chlorine-containing stilbenes.

Other objects will be apparent from the following description.

These objects have been accomplished by the process of preparing halogen-containing compounds which comprises heating a mixture of:

(a) A trihalomethyl substituted aromatic compound having the structure $$Ar(CX_3)_y$$

where Ar is a non-functional aromatic radical attached to the carbon atom through a benzenoid carbon atom, X is a halogen atom, and y is an integer between 1 and 3;
(b) Elemental phosphorus; and
(c) From about 0.001 to about 2.0% of the combined weight of (a) and (b) of a compound selected from the class consisting of iodine, iodine monochloride, and metal halides in which the metal is selected from the class consisting of the metals of groups I, II, IIIB, IV, VB, VIA, VIIA and VIII.

The trihalomethyl substituted aromatic compounds comprise principally benzotrihalides and substituted benzotrihalides such as benzotribromide, substituted benzotribromides, benzotrichloride and substituted benzotrichlorides. Such compounds may readily be prepared by the halogenation of toluene and the corresponding substituted toluenes. Other preparative methods such as alkylation of benzotrihalides may also be used. Illustrative examples of such trihalomethyl substituted aromatic compounds are benzotribromide, monochloro mesitylene, benzotrichloride, p-chlorobenzotrichloride, o-bromobenzotrichloride, alkylbenzotrichlorides, polyalkyl benzotrichlorides, 3-trichloromethyl pyridine, 4-trichloromethyl quinoline, p-phenylbenzotrichloride, trichloromethyl substituted polynucleus aromatic compounds such as trichloromethyl naphthalene, etc. The trichloromethyl substituted aromatic compounds are preferred for use in the reaction described herein because of their availability at the present time.

It will be noted that in each of the above examples the aromatic residue is non-functional; i.e., it does not contain any functional groups which might take part in or interfere with the reaction of the hereindescribed process.

Although the physical characteristics of the elemental phosphorus which may be used in the process are not critical, it is preferred to use red phosphorus.

The relative amounts of reactants determine the character of the product which is available therefrom. The function of the phosphorus appears to be associated with its ability to abstract halogen from two molecules of trihalomethyl compound, the resulting by-product consisting largely of phosphorus trihalide which is readily removed from the reaction mixture by distillation. Accordingly, a high phosphorus to trihalomethyl compound ratio will result in a product having less halogen than in the case of a reaction mixture which contains a low phosphorus to trihalomethyl compound ratio.

Generally, when it is desired to prepare dihalostilbenes, a ratio of one mole of phosphorus to one mole of trihalomethyl compound is used. On the other hand, the use of one mole of phosphorus per three moles of trihalomethyl compound results in the formation of a relatively large proportion of tetrahaloethanes.

As indicated, the reaction is catalyzed by a compound selected from the class consisting of iodine, iodine monochloride and metal halides in which the metal is selected from the class consisting of the metals of groups I, II, IIIB, IV, VB, VIA, VIIA and VIII. These catalysts are effective in very small amounts, as small as 0.001% of the combined weight of the trihalomethyl-substituted aromatic compound and the elemental phosphorus reactants. The effectiveness of increased amounts of catalysts appears to level off above about 2.0% of this combined weight of the two reactants; larger amounts of catalysts may be used without apparent ill effects, but there appears to be no significant advantage attending the use of such larger amount. The metal of the metal halides group of catalysts may be any metal of groups I, II, IIIB, IV, VB, VIA, VIIA and VIII as shown in the "Periodic Classification of the Elements" in Moeller's "Inorganic Chemistry," Wiley, N.Y., 1952, page 122. It will be noted that according to this classification group I includes lithium, sodium, potassium, rubidium, cesium, francium, copper, silver and gold; that group II includes beryllium, magnesium, calcium, strontium, barium, radium, zinc, cadmium and mercury; that group IIIB includes boron, aluminum, gallium, indium and tantalum; that group IV includes titanium, zirconium, hafnium, germanium, tin and lead; that group VB includes arsenic, antimony and bismuth; that group VIA includes chromium, molybdenum and tungsten; that group VIIA includes manganese; and that group VIII includes iron, cobalt, nickel, ruthenium, rhodium, palladium, osmium, iridium and platinum. All of these metals are contemplated in terms of their halides for the purposes of this invention. Specific examples of such metal halides coming within the scope of this definition of the catalysts intended for use in the process include lithium iodide, sodium iodide, potassium bromide, silver iodide, cesium iodide, beryllium iodide, magnesium bromide, strontium iodide, cupric iodide, gold chloride, cadmium iodide, gallium tribromide, indium trichloride, tantalum trifluoride, germanium trichloride, lead iodide, arsenic triiodide, bismuth chloride and antimony penta chloride.

The reaction of the process requires somewhat elevated temperatures. The usual reaction will be run, for example, at a temperature within the range of 150° to 300° C., although within the limits imposed by the stability of the reactants the reaction may be carried out at even higher temperatures. Likewise, in some particular instances the process may be carried out at temperatures below 150° C., for example at 125° C. In most cases, the reaction will require at least one hour. The progress of the reaction may be noted by the amount of phosphorus trihalide which distills from the reaction mixture and when this distillation has ceased, it may be assumed that the reaction is complete. Usually all of the available phosphorus trihalide has been distilled within four or five hours. The reaction generally is carried out at atmospheric pressure although it may in some particular instance be carried out at super-atmospheric or reduced pressure.

When all of the phosphorus trihalide has distilled from the reaction mixture, there usually remains some unreacted phosphorus. This can be removed by adding an organic solvent such as benzene to the mixture and filtering the benzene solution from phosphorus. Removal of the organic solvent from the filtrate by evaporation and subsequent distillation of the residue yields the desired product. The product may be purified further by crystallization from an organic solvent.

A particularly valuable application of the process resides in the use as starting materials of bis-(trihalomethyl) aromatic compounds. Such starting materials are illustrated by bis-(p-trihalomethyl) benzene which is the completely aliphatically halogenated product of p-xylene. It will be noted that in the process of this invention such a starting material is bifunctional. The reaction of a bis-trihalomethyl compound with phosphorus in the presence of small amounts of a catalyst is in effect a polymerization reaction.

Again depending upon the relative amounts of reactants employed, the polymeric product may contain either dihalostilbene units or tetrahalobibenzyl units. In either case the polymeric product is useful with regard to applications in the field of electrical insulation, etc.

The preparation of such polymers may be effected by the same process by which the hereinbefore described products are prepared.

The process of the invention is illustrated in more detail by the following examples:

*Example 1*

A mixture of 782 grams (4.0 moles) of benzotrichloride, 124 grams (4.0 moles) of red phosphorus and 0.8 gram of iodine was heated with stirring to 205° C. within 30 minutes. Phosphorus trichloride began to distill almost immediately and continued to distill for six hours during which time the temperature of the reaction mixture rose gradually to 275° C. At the end of six hours a total of 348 grams of phosphorus trichloride had been collected. The residue was extracted with benzene and this extract then was freed of benzene by distillation. The residue was distilled to yield 374 grams of a white crystalline solid boiling at 104° to 106° C./6.1 mm. Analysis of the product indicated a chlorine content of 29.1 percent, the theoretical chlorine content for alpha,alpha'-dichlorostilbene being 28.5 percent.

*Example 2*

A mixture of 391 grams (2.0 moles) of benzotrichloride, 62 grams (2.0 moles) of red phosphorus and .01 gram of iodine was heated with stirring at 220° to 250° C. for four hours. During this time a total of 123 grams of phosphorus trichloride was collected as distillate from the reaction mixture. The residue was extracted with benzene leaving 25 grams of unreacted solid phosphorus. Concentration of the benzene extract yielded 250 grams of a dark brown solid residue which upon distillation yielded 225 grams of a distillate melting at 95° to 105° C. Analysis of this distillate indicated its chlorine content as 28.1 percent. The melting range of the product indicated it to be a mixture of cis- and trans-isomers of alpha,alpha'-dichlorostilbene.

*Example 3*

A mixture of 115.5 grams (0.5 mole) of p-chlorobenzotrichloride, 5.2 grams (0.17 mole) or red phosphorus, and 0.1 gram of iodine was heated with stirring at 215° to 260° C. for two hours. In this time 19 grams of phosphorus trichloride was obtained. Extraction of the residue with benzene and concentration of this extract yielded 33 grams of a white solid melting at 189° to 190° C. and having a chlorine content of 54.7 percent. This analysis corresponds to the theoretical value for alpha,alpha,alpha'-alpha'-4.4'-tetrachlorobibenzyl.

*Example 4*

A mixture of 231 grams (1.0 mole) of p-chlorobenzotrichloride, 31 grams (1.0 mole) of red phosphorus and 0.26 gram of iodine was heated with stirring at 205° to 265° C. for 3.5 hours. A total of 85 grams of phosphorus trichloride was collected after which the dark brown residue was extracted with benzene. Removal of benzene from this extract and distillation of the residue yielded 112 grams of a light yellow solid boiling at 135° to 147° C./0.15 mm. Analysis of this yellow solid product indicated a chlorine content of 43.9 percent which compares favorably with a theoretical value of 44.4 percent for alpha,alpha'-4.4'-tetrachlorostilbene.

*Example 5*

A mixture of 195.5 grams (1.0 mole) of benzotrichloride, 31 grams (1.0 mole) of red phosphorus and 2 grams of zinc chloride was heated over a period of 1.5 hours to 195° C. at which point phosphorus trichloride was evolved from the reaction mixture. The mixture was stirred for an additional 3.5 hours at 195°–230° C. During this period, a total of 56 grams of phosphorus trichloride was collected as distillate. The brown solid residue was extracted with benzene and the benzene extract concentrated to 140 grams of a brown solid. Recrystallization of this solid from benzene yielded 45 grams of a solid product which had a chlorine content of 41.9 percent. The corresponding theoretical value for alpha,alpha,alpha',alpha'-tetrachlorobibenzyl is 44.4 percent.

*Example 6*

A mixture of 195.5 grams (1.0 mole) of benzotrichloride, 31 grams (1.0 mole) of red phosphorus, and 0.2 gram of mercuric iodide was heated with stirring over a two-hour period to 190° C., and for an additional three hours at 180° C.–230° C. A total of 68 grams of phosphorus trichloride was distilled from the mixture in this time leaving 156 grams of residue as the reaction product. This product was extracted with benzene and the resulting benzene extract was concentrated to 137 grams of residue. This residue was extracted with ether and the ether extract in turn concentrated to a residue which upon distillation yielded 51 grams of a white solid boiling at 118°–121° C. at 0.6 mm. This product had a chlorine content of 28.5 percent, which is the theoretical value for the chlorine content of alpha,alpha'-dichlorostilbene.

*Example 7*

To a mixture of 195.5 grams (1.0 mole) of benzotrichloride and 31 grams (1.0 mole) of red phosphorus there was added with stirring at room temperature 2 grams of potassium triiodide (0.79 gram of potassium iodide—1.21 grams of iodine). This mixture was stirred for 15 minutes at 25° C. and then heated to 185° C. within 45 minutes. At this temperature phosphorus trichloride was evolved from the mixture. Heating was continued for two hours at 175°–225° C. whereupon a total of 95 grams of phosphorus trichloride was distilled from the mixture. The residue was extracted with benzene and the ether extract evaporated to 103 grams of a reddish-brown solid. This solid was distilled to yield 54 grams of a light yellow solid boiling at 109°–112° C. at 0.4 mm. This solid was shown to contain 27.4 percent chlorine. The theoretical value for alpha,alpha'-dichlorostilbene is 28.5 percent.

*Example 8*

The procedure of Example 7 was followed using, instead of potassium tri-iodide, 2 grams of stannic chloride as catalyst. The yield of alpha,alpha'-dichlorostilbene, having a chlorine analysis of 29.8 percent, was 64 grams.

*Example 9*

The procedure of Example 7 was repeated using, instead of potassium tri-iodide, 2 grams of potassium iodide as catalyst. The yield of alpha,alpha'-dichlorostilbene, having a chlorine analysis of 27.1 percent, was 43 grams.

*Example 10*

A mixture of 195.5 grams (1.0 mole) of benzotrichloride, 31 grams (1.0 mole) of red phosphorus and 1.53 grams of iodine monochloride was heated to 180° C. at which temperature phosphorus trichloride began to distill. The mixture was then heated at 190° C. to 230° C. for five hours, during which time a total of 77 grams of phosphorus trichloride was collected. The residue was cooled to room temperature and was extracted with benzene and this extract was freed of benzene by distillation. The residue was distilled at 121°–125° C./0.75 mm. to yield 61 grams of product. Analysis of this product indicated a chlorine content of 28.08 percent, the theoretical chlorine content for alpha,alpha'-dichlorostilbene being 28.5 percent.

*Example 11*

To a mixture of 117.3 grams (0.6 mole) of benzotrichloride and 2 grams of iodine there was added portionwise at room temperature 9.3 grams (0.3 mole) of yellow phosphorus. The mixture was heated gradually to 175° C. in four hours at which temperature some phosphorus trichloride began to distill. The mixture was then heated to 175°–200° C. for three hours. The residue was cooled to room temperature and was extracted with benzene. The extract was freed of benzene by distillation. The residue was separated into two portions by ether extraction. The ether-insoluble portion was recrystallized from benzene to give 18 grams of product A, M.P. 160°–161° C. The analysis of A indicated a chlorine content of 45.2 percent, comparing favorably with a theoretical chlorine content of 44.4 percent for alpha,alpha,alpha',alpha'-tetrachlorobibenzyl. The ether-soluble portion was freed of ether by distillation. The residue was distilled at 100°–115° C./0.1 mm. to yield 18 grams of product B. The analysis of product B indicated a chlorine content of 29.6 percent comparing favorably with a chlorine content of 28.5 percent for alpha,alpha'-dichlorostilbene.

*Example 12*

To a mixture of 82.3 grams (0.25 mole) of benzotribromide and 0.23 gram of iodine there was added at 100° C. 7.75 grams (0.25 mole) of red phosphorus. The mixture was heated carefully to 200° C. and the temperature maintained at 196 to 200° C. for five hours. The resulting mixture was cooled to room temperature, extracted with benzene, and the benzene extract freed of benzene by distillation. The residue was distilled to yield 31 grams of phosphorus tribromide boiling at 70–77° C./30 mm. The dark residue, weighing 50 grams solidified upon cooling. A portion of this solid residue was crystallized from ethanol to yield a yellow solid melting at 198 to 203° C. The melting point reported in the literature for trans-alpha,alpha'-dibromostilbene is 211° C.

*Example 13*

A mixture of 156.5 grams (0.5 mole) of p-bis-(trichloromethyl) benzene, 31 grams (1.0 mole) of red phosphorus, and 0.23 gram of iodine was heated at 235 to 290° C. for two hours. A total of 48 grams of phosphorus trichloride was collected as distillate. The residue was extracted with benzene and this benzene extract was treated with methanol to precipitate 62 grams of a polymeric product having a chlorine content of 52.5 percent and an average molecular weight of 1600.

*Example 14*

A mixture of 158 grams (0.8 mole) of benzotrichloride, 16.8 grams (0.53 mole) of red phosphorus and 2.0 grams of antimony pentachloride was heated with stirring for 12 hours at 230° C. During this time phosphorus trichloride was distilled from the reaction mixture. The residue then was distilled at 150° C./1 mm. The distillate was crystallized from ethanol to yield 6.2 grams (62% of the theory) of alpha,alpha'-dichlorostilbene, having a chlorine content of 28.2%.

*Example 15*

The procedure of Example 14 was repeated using 0.5 gram of zinc bromide in place of the 2.0 grams of antimony pentachloride. The yield of alpha,alpha'-dichlorostilbene having a chlorine content of 28.2% was 64.7 grams (64.7% of the theory).

*Example 16*

A mixture of 39.0 grams (0.2 mole) of benzotrichloride, 4.3 grams (0.13 mole) of red phosphorus and 0.5 gram of sodium iodide was heated with stirring at 235–240° C. for 5 hours. Phosphorus trichloride was distilled from this mixture for the first 3 hours of this period. The residue was distilled and the resulting distillate was crystallized from ethanol. The yield of alpha,alpha'-dichlorostilbene was 12.8 grams (51.2% of the theory); the chlorine analysis was 28.3%.

*Example 17*

The procedure of Example 15 was repeated using 0.5 gram of calcium bromide instead of 0.5 gram of sodium iodide. The resulting product constituted a 49% yield and showed a chlorine content of 28.2%.

*Example 18*

A mixture of 59 grams (0.3 mole) of benzotrichloride, 6.4 grams (0.2 mole) of red phosphorus and 0.5 gram of zinc iodide was heated with stirring at 240° C. for 5 hours. Phosphorus trichloride was distilled from this heated mixture during this period. The residue was filtered while hot and then distilled to give 32 grams of a distillate. This distillate was crystallized from ethanol, yielding 25.1 grams (66.5% of the theory) of alpha,alpha' - dichlorostilbene. The chlorine analysis was 29.4%.

*Example 19*

The procedure of Example 17 was repeated using instead of the zinc iodide, 0.5 gram of silver iodide. The yield of alpha-alpha'-dichlorostilbene was 21.4 grams or 55.4% of the theory. The chlorine analysis was 28.3%.

*Example 20*

A solution of 78 grams (0.4 mole) of benzotrichloride in 150 ml. of o-dichlorobenzene was treated with 4.2 grams (0.14 mole) of red phosphorus and 0.5 gram of zinc bromide, then heated with stirring at 185° C. for 6 hours. The o-dichlorobenzene then was removed by distillation and the residue crystallized from toluene. The yield of sym-diphenyltetrachloroethane was 8.2 grams (12.5% of the theory). The chlorine analysis was 44.3%.

*Example 21*

To a solution of 78 grams (0.4 mole) of benzotrichloride in 150 ml. of diphenyl ether there was added 8.4 grams (0.28 mole) of red phosphorus and 0.5 gram of zinc bromide. This solution then was heated with stirring at 240° C. for 6 hours, phosphorus trichloride distilling from the reaction mixture during this time. The residue was distilled to yield a product having a chlorine analysis of 15.8%. It appeared that this product contained an appreciable amount of diphenyl ether which would account for the low chlorine analyses.

The following procedure was employed to test the efficacy of various metal halides as catalysts in the process involving the reaction of benzotrichloride and phosphorus. A solution of 78 grams (0.4 mole) of benzotrichloride in 150 ml. of o-dichlorobenzene was treated with 4.2 grams (0.14 mole) of phosphorus and 0.5 gram of metal halide. This solution was heated with stirring at 185° C. for a period of time ranging from 4 to 7 hours. In each case phosphorus trichloride distilled from the reaction mixture during this time. This hot reaction mixture was filtered and the residual product in each case was identified by chlorine analysis and melting point as sym-diphenyltetrachloroethane. The results in each case are summarized in the table below.

| Ex. | Catalyst | Product | |
|---|---|---|---|
| | | Cl anal. (Percent) | Yield (Percent) |
| 22 | silver iodide | 44.1 | 26.8 |
| 23 | sodium iodide | 44.4 | 50.6 |
| 24 | aluminum chloride | 44.3 | 4.7 |
| 25 | zinc iodide | 42.9 | 47.5 |
| 26 | barium iodide | 44.1 | 48.0 |
| 27 | chromium iodide | 42.9 | 15.0 |
| 28 | manganese iodide | 42.4 | 30.0 |
| 29 | titanium iodide [1] | 42.6 | 13.0 |
| 30 | ferrous iodide | 44.0 | 34.0 |

[1] This "titanium iodide" catalyst was actually a mixture of about one part of titanium iodide and four parts iodide chloride.

The products available from the process of this invention are useful as plasticizers for polyvinyl chloride, as synergists for DDT, and insecticides.

Other modes of applying the principle of the invention may be employed, change being made as regards the details described, provided the features stated in any of the following claims or the equivalent of such be employed.

This application is a continuation-in-part of application Serial Number 539,683, filed on October 10, 1955, now abandoned.

We therefore particularly point out and distinctly claim as our invention:

1. The process of preparing halogen-containing compounds which comprises heating at a temperature within the range of 125–300° C. a mixture of:

(a) a trihalomethyl-substituted aromatic compound having the structure $$Ar(CX_3)_y$$

where Ar is a non-functional aromatic radical attached to the carbon atom through a benzenoid carbon atom, X is a halogen atom selected from the class consisting of chlorine and bromine atoms and y is an integer between 1 and 3;

(b) elemental phosphorus in an amount such that the molar ratio of (a) to (b) is between about 1:1 and 3:1, and (c) from about 0.001 to about 2.0% of the combined weight of (a) and (b) of a compound selected from the class consisting of iodine, iodine monochloride, and metal halides in which the metal is selected from the class consisting of the metals of groups I, II, IIIB, IV, VB, VIA, VIIA and VIII.

2. The process of claim 1 characterized further in that the trihalomethyl-substituted aromatic compound of (a) is a trichloromethyl-substituted benzene.

3. The process of claim 1 characterized further in that the trihalomethyl-substituted aromatic compound of (a) is benzotrichloride.

4. The process of claim 1 characterized further in that the compound of (c) is iodine.

5. The process of preparing halogen-containing compounds which comprises heating at a temperature within the range of 125–300° C. a mixture of:

(a) a trichloromethyl-substituted benzene, (b) elemental phosphorus in an amount such that the molar ratio of (a) to (b) is between about 1:1 and 3:1, and (c) from about 0.001 to about 2.0% of the combined weight of (a) and (b) of iodine.

6. The process of claim 1 characterized further in that the molar ratio of (a) to (b) is about 1:1.

7. The process of claim 1 characterized further in that the molar ratio of (a) to (b) is about 3:1.

References Cited in the file of this patent

Huntress, "Organic Chlorine Compounds," pp. 379–80 (1948).